United States Patent [19]

Reil et al.

[11] Patent Number: 4,725,213

[45] Date of Patent: Feb. 16, 1988

[54] CLOSURE DEVICE FOR AN INJECTION MOULDING APPARATUS

[75] Inventors: Wilhelm Reil, Bensheim; Ulrich Deutschbein, Muhltal, both of Fed. Rep. of Germany

[73] Assignee: Tetra Pak Finance & Trading S.A., Pully, Fed. Rep. of Germany

[21] Appl. No.: 18,494

[22] Filed: Feb. 25, 1987

[30] Foreign Application Priority Data

Feb. 27, 1986 [DE] Fed. Rep. of Germany ....... 3606280

[51] Int. Cl.⁴ ..................... B29C 45/14; B29C 45/33; B29C 45/66

[52] U.S. Cl. .................................. 425/117; 425/122; 425/126 R; 425/127; 425/129 R; 425/575; 425/589; 425/592; 425/593; 425/451.5; 425/451.9

[58] Field of Search ............ 425/116, 117, 121, 126 R, 425/129 R, 576, DIG. 41, 575, 127, 451, 451.5, 451.6, 451.9, 574, 589, 592, 593

[56] References Cited

U.S. PATENT DOCUMENTS 4,276,013 6/1981 Bazzea ............................. 425/451.6
4,525,318 6/1985 Reil et al. ............................. 264/259

Primary Examiner—Willard Hoag
Attorney, Agent, or Firm—Paul and Paul

[57] ABSTRACT

Described is a drive for injection mould parts of a synthetic plastics injection moulding apparatus for injecting a wall part on a paper web, with at least one supply injector fixed on a carrier, a plurality of injector heads rigidly connected thereto and with driven connecting levers.

So that parallel webs of a packaging tube can be passed more closely beside one another so that it is possible to manage with a few plasticising units in the smallest space and with short flow paths for the synthetic plastics material, it is according to the invention envisaged that the direction of conveyance of the paper web extend at a right-angle to the direction of opening and direction of closure of the mould parts, a plurality of pairs of movable mould parts being disposed adjacent one another at a distance (X) in the opening and closing directions, the connecting levers which take the form of ties and knee levers being so articulated that during injection, the forces which arise are mutually reinforcing and the carrier can be of lighter weight construction, at least in its middle portion.

6 Claims, 10 Drawing Figures

CLOSURE DEVICE FOR AN INJECTION MOULDING APPARATUS

The invention relates to a device for driving injection mould parts of a synthetic plastics injection apparatus for injecting a wall part on a paper web, with at least one supply injector fixed on a carrier, a plurality of injector heads connected rigidly thereto and with driven connecting levers; and the invention also relates to the use of this device for the manufacture of liquid packagings.

All manner of injection moulding apparatuses are available for injecting or integrally moulding wall parts on a paper web, the products which is to be worked on being guided in a line through mutually movable injection mould parts and being operated on intermittently one after another. For example, a method is already known for producing a liquid packaging, of which the tubular side walls consist of a synthetic plastics coated carrier material, e.g. paper or cardboard, and the bottom of which is produced in a rectangular shape by being folded and sealed and of which one cover consisting only of synthetic plastics material and comprising an opening device is integrally moulded on the top edge of the tube which constitutes the side walls. With this method, the tubular pieces of coated paper are passed in a line through the injection moulding apparatus, the side walls or paper tube formed in a cylindrical shape, being mounted and guided on a mandrel, preferably one of a plurality of mandrels disposed on a wheel. The mandrels on the wheel in such manufacturing machines constitute the bottom mould part while the upper mould part is itself divisible, its two parts, the upper mould parts, being movable relative to each other. This sub-division of the upper mould is particularly expedient when producing suitable opening devices in the end wall, i.e. in the lid, of a packaging for a liquid.

It will be appreciated that for the opening and closing movement of the upper mould, a minimum space is required because a not inconsiderable overall space is needed for the strongly constructed controlling and articulating parts of the injection mould drive. Particularly when leading through the bottom moulds which take the form of mandrels mounted on a wheel, the opening and closing direction of the upper mould parts can be only sideways, i.e. at a right-angle to the direction of movement of the mandrels or bottom mould parts. Indeed, it is possible for the upper mould also to be lifted and opened in the direction of the mandrel axis outwards or upwards but the constructions on the machine necessary for this are so cumbersome, expensive and bulky that lateral movement and control means have been found to be more expedient.

However, where the manufacture of liquid packagings is concerned, the problem often arises of the high output of a packaging material (quantity per unit of time). For injecting a lid on a paper tube, a minimum time is necessary for setting up, closing, injecting, opening and hardening-out and this minimum time must not be reduced. If it is desired to improve the output of such a package producing machine, then it is necessary to double the entire packaging producing units, i.e. to dispose various production lines alongside one another. The distance between these production lines and hence the distance between the adjacent injection moulding apparatuses is, however, quite considerable due to the aforesaid space requirements for the upper mould opening and closing means. Such a machine would be bulky and would be difficult to set up and operate.

Furthermore, it has been demonstrated that the use of a single plasticising unit with a supply injector, lines and injector head calls for considerable investment. A man skilled in the art has therefore tried to group together a plurality of injector heads, which, when the packaging machine is operated, have to be moved directly to the mould space between upper and lower mould parts, and to connect them to a supply injector. By reason of the considerable distances between adjacently disposed injection moulding apparatuses, such long supply lines have resulted that the extruded synthetic plastics set prematurely and the injector heads malfunction.

The object of the invention, therefore, is to improve the aforedescribed apparatus so that parallel webs of the workpiece (e.g. a paper web, paper tube, or the like) can be guided more closely beside one another and can be kept in a generally closer relationship in order as far as possible to manage with only a single plasticising unit in the smallest amount of space with short flow paths for the extruded synthetic plastics material.

According to the invention, this problem is resolved in that the direction of conveyance of the paper web is substantially at a right-angle to the opening and closing direction of the mould parts, at least two pairs of mould parts movable relative to each other being disposed beside each other at a distance in the direction of opening and closure, the connecting levers in the form of ties and knee levers being so articulated that each pair of mould parts is guided by at least two bearing journals in a rail extending parallel with the direction of opening and closure of the mould parts, each bearing journal disposed between pairs of mould parts being articulated on the one hand through two pairwise disposed knee levers to be rotatable on the nearest mould part and on the other on a tie which is maintained stationary at one end, the two knee levers being connected to each other at a movable pivot point and to the movable carrier and in that whichever is the bearing journal which guides the outermost mould part is connected on the one hand to a tie which is maintained stationary at one end and on the other, through a knee lever is rotatably connected to the movable carrier. Despite the disposition of a plurality of pairs of mould parts adjacent to one another in their direction of opening and closure, it is possible with the new drive apparatus to achieve substantially shorter flow paths for the synthetic plastics material from one supply injector to the various injector heads. Due to the careful disposition and construction of the connecting levers and the means of guiding the drive forces through these ties and levers, the distance between adjacent pairs of mould parts can be substantially reduced. By the disposition of a movable carrier into which the driving forces are initiated, a favourable driving and powerful supporting of the bearing journals and thus of the individual mould parts can be guaranteed in order satisfactorily to accommodate the considerable forces required. The carrier need only be of stronger construction at its ends for the mould parts which are disposed at the outer ends, while in the middle it can manage with smaller components. In the middle zone, i.e. between the pairs of mould parts, care is taken that these are braced substantially against one another without the pressures which occur in the middle zone during injection moulding having to be initiated into the movable carrier. Thus, the overall construction of the connecting levers can be smaller so that the distance between pairs of adjacent mould parts and thus the flow paths for the extruded synthetic plastics can be reduced.

According to the invention, it is advantageous if the knee levers of each pair of knee levers of adjacent pairs of mould parts, in the closed condition of the mould parts, are at an angle to each other of 0° to 15° and preferably 0° to 5°, i.e. are disposed substantially in one line and one behind another. With this angular position of the knee levers which belong to one pair, it is possible to see the favourable force guidance of two adjacent mould parts from two adjacent pairs of mould parts, namely in respect of each other so that during injection moulding the resultant pressures are mutually reinforcing.

In a further development of the invention, the rail is movable at a right-angle to its longitudinal axis by the bearing journals which are guided in it. To keep the individual mould parts parallel, these ought, in addition to the aforesaid bearing journals, to be provided also with further guide journals which are likewise guided in the said rail. The rail itself therefore serves only guiding purposes and does not need to accommodate excessive forces. This in turn permits of free mobility of the rail itself and thus of the bearing journals, which in turn (the mobility) permits a relatively simple articulation of the levers which control the opening and closing movements, the driving forces being at the same time initiated in a particularly simple manner.

According to the invention, it is furthermore advantageous if the carrier takes the form of a comb having end arms and middle arms, on whichever is the free end of which there is the movable pivot point. The relatively light form of the middle part of the carrier has already been explained hereinabove. By the provision of middle arms of smaller dimensions, the entire carrier can be kept relatively small and light in weight, only the end arms having, at the beginning and end of a chain of pairs of mould parts, to move whichever is the outermost mould part and accommodate the pressure forces exerted by it. This moving carrier expediently supports the supply injector and also the individual injector heads, and permits the disposition of hot ducts, i.e. the conductors for the extruded synthetic plastics material from the supply injectors to the individual injector heads.

Where the construction of a drive device of the aforedescribed type is concerned, it is possible to inject synthetic plastics parts into a strip of paper coated on both sides with synthetic plastics material, with a high level of output (working process per unit of time). The injection moulding points can namely, by reason of the confined space available for the connecting levers, be disposed relatively closely adjacently in a chain, so that for example four or eight injection operations can be undertaken on a line which extends in a zig-zag formation through the chain of injection apparatuses. If this line incorporates, for example, a chain of stamped-in holes, then it is possible to inject covering films, opening devices or the like into these holes. Since the process of injection moulding this end wall or also films of the end wall on a paper tube requires a certain minimum time, the performance can be increased if a plurality of injection processes are carried out on the paper web simultaneously.

In a particularly expedient manner, one embodiment of the invention is characterised in that each pair of mould parts forms an upper mould part while bottom mould parts movable relative thereto are formed by intermittently rotatably driven mandrels mounted on a wheel, the spindle of the wheel being substantially in the direction of opening and closure of the upper mould part and if at least two mandrel carrying wheels with a common axis of rotation are disposed at the said distance from and alongside each other. In this way, end walls can be injection moulded on a paper tube of a liquid packaging with a high level of output because then there is a special drive available for the upper injection mould parts, permitting of a close disposition of or smaller distance between the individual mandrel carrying wheels.

By adopting the measures according to the invention, therefore, the use of the aforedescribed apparatus is particularly advantageous when manufacturing packagings for liquids where an end wall of synthetic plastics material is injection moulded on the paper tube of the packaging, the side walls thereof being constituted by the tube and consisting of a paper coated on both sides with synthetic plastics material, packagings for liquids, particularly milk and fruit juices, are a mass produced item for which high output manufacturing machines are required. Dairies or fruit juice manufacturers do not, however, have a lot of space available to accommodate the packaging machines and therefore expect a high rate of output on a minimal floor area. The output of the new packaging machine when using the driving device according to the invention is unexpectedly high with a perfect injection moulding of the individual parts.

However, it is also advantageous to use the said device for producing packagings for other types of liquids, namely by injection moulding an opening device of synthetic plastics material into a side or end wall of the packaging which consists of paper coated on both sides with synthetic plastics material, the side and/or end walls being connected to one another by folded edges and/or welded seams. Thus, it is possible in a practical manner to provide a conventional liquid packaging which consists, for example, completely of paper or cardboard, with an opening device because a covering film can be quickly and reliably injected into a prestamped hole.

Further advantages, features and possible applications of the present invention will become evident from the ensuing description of preferred embodiments in conjunction with the accompanying drawings, in which.

Figure 1:
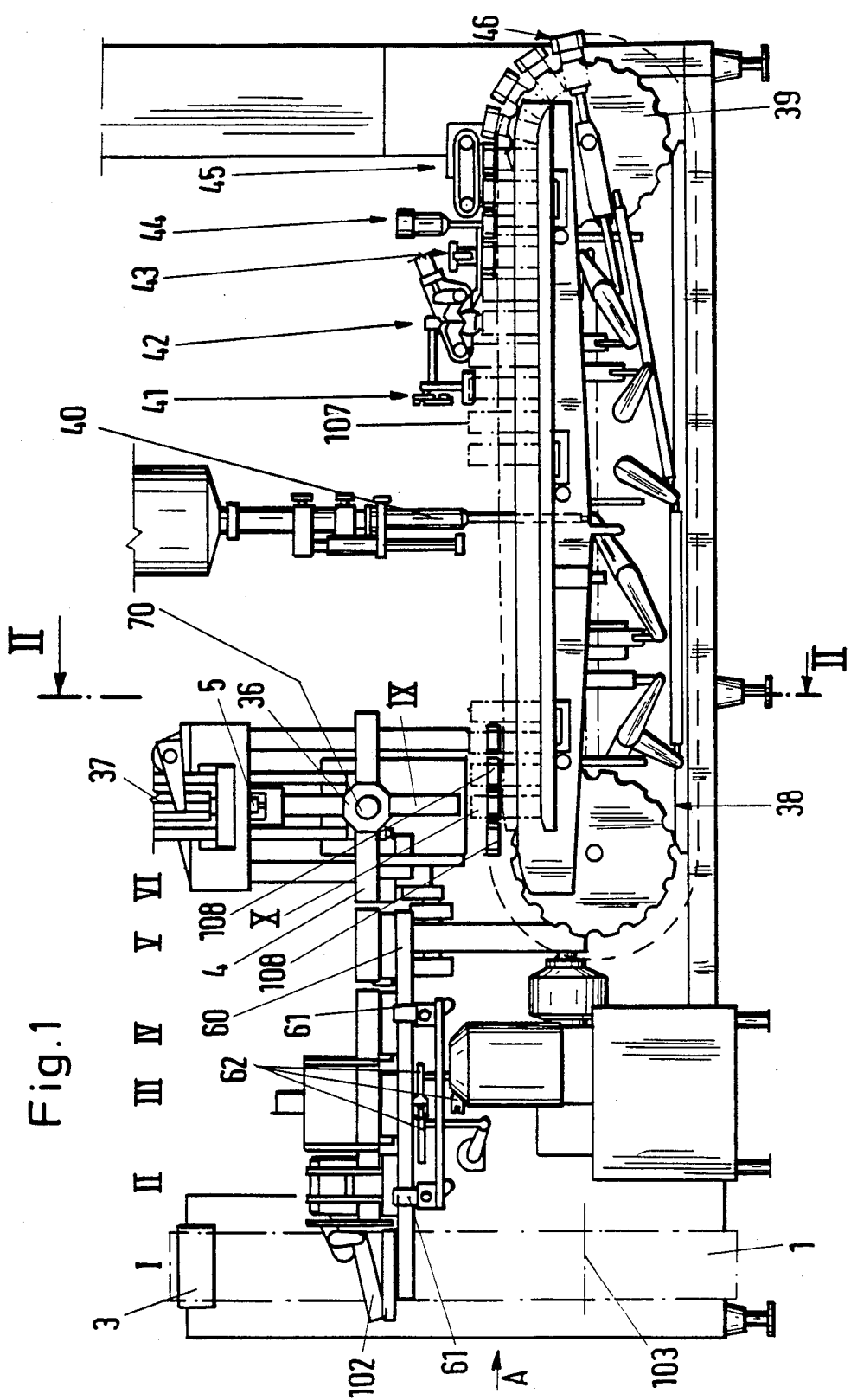
FIG. 1 is a side view of a high-output packaging machine for liquids.

Shown in FIGS. 1 to 5 is a device for producing liquid packagings in which an end wall consisting only of synthetic plastics material is injected at one end on the tubular side walls of the packaging. Manufacture takes place in broad stages, as can best be seen in FIG. 1. From the roll 1, the paper strip 2 runs in a direction of the arrow A over a first guide roller 3 in position I over further reversing and pull-off rollers not shown in greater detail but which are finally so driven with an intermittent action that after the necessary marking and score lines have been applied, the strip is fed into the cutting apparatus 102. Here, the strip is separated into four portions which are then passed by conveyor means 60, 61, 62 from position II to position V. On the way, the initially flat blank is folded up into a tube which is pushed along a mandrel. In position VI, the package has reached the first mandrel 4 on a mandrel-carrying wheel generally designated 36 and which rotates in a clockwise direction as viewed in FIG. 1. The injection apparatus is generally designated 37 and is disposed above the wheel 36. Also shown is the injector head 5. After the end wall 6 of the package shown in FIG. 8 has been integrally moulded, the tube is rotated from the vertical downwards into the horizontal and through a further 90° downwards into position IX from which the tube is pulled off downwards into position X. Now the paper tube 107 is located in receiving parts 108 which are disposed adjacent one another, as can also be seen in FIG. 2. These receiving parts 108 belong to the conveying apparatus generally designed 38 in FIG. 1 and which consists of an endless chain of rows of receiving parts 108, and which passes over guide wheels 39. When the relevant row of packages, after leaving position X, reaches the filling station 40, the package which is open at the top and closed at the bottom is filled and at station 41, the height of the package, i.e. the top edge of the paper tube, is brought to an exactly defined height before closure takes place in station 42. At station 43, the bottom of the package is folded in that triangular flaps are formed which project upwardly. At 44, there is a hot air blowing device for heating the outer surfaces and folding over the triangular flaps on the bottom of the package. This folding over occurs during onwards transportation from station 44 to station 45 and is achieved by suitable sliding bars. Reference numeral 45 denotes a co-rotating pressure-applying station which extends beyond at least two rows of packages. At every two strokes, this station 45 applies pressure to the triangular flaps, i.e. two serially disposed packages, so that the pressing time is extended. In the almost horizontal direction in position 46 (on the right in FIG. 1), the package is now ejected onto a conveyor chain, not shown.

Figure 2:
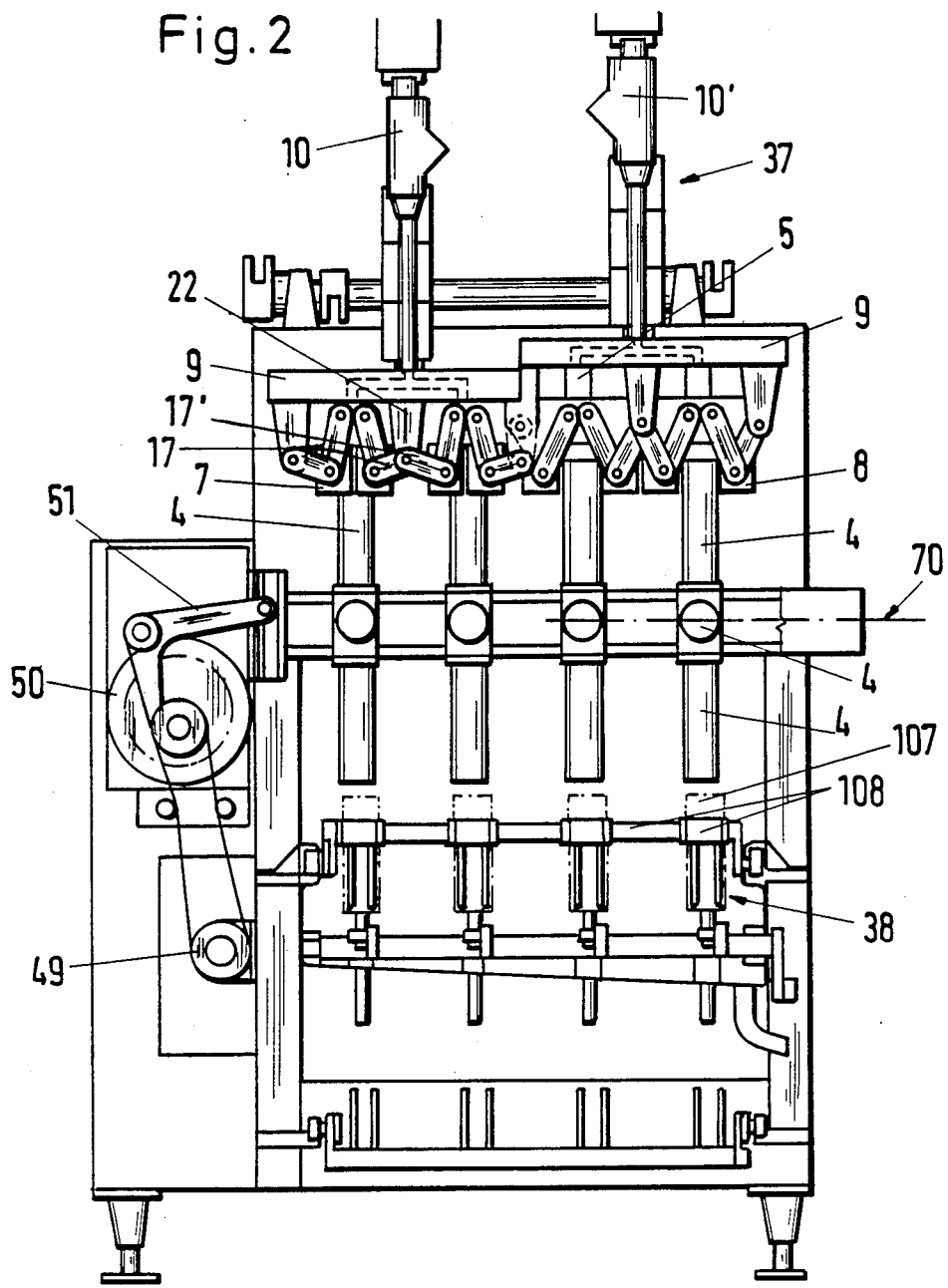
FIG. 2 is a diagrammatic sectional view taken on the line II—II in FIG. 1.
Figure 3:
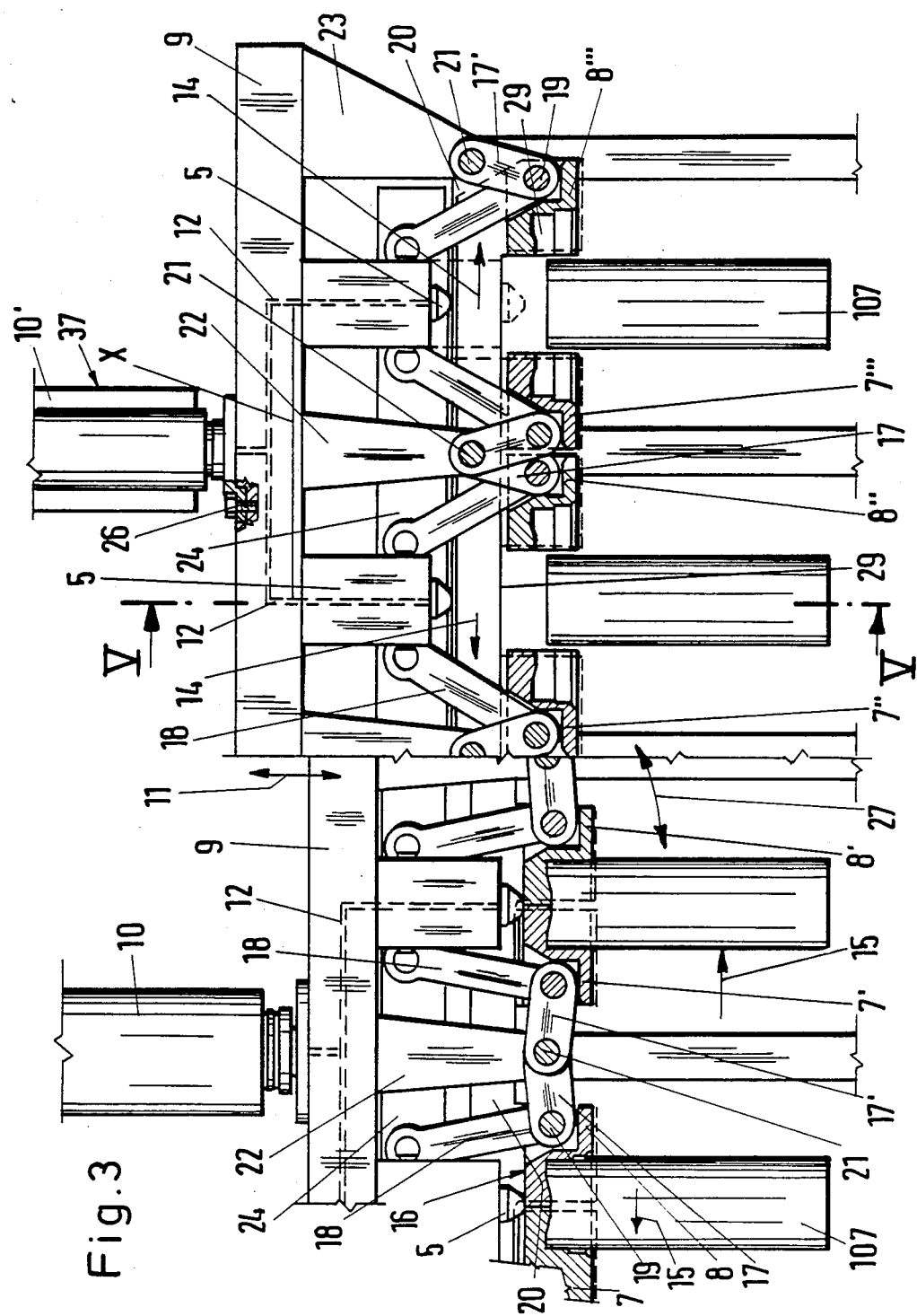
FIG. 3 shows diagrammatically a broken away partial view according to FIG. 2 in which substantially only the upper mould parts are shown.
Figure 4:
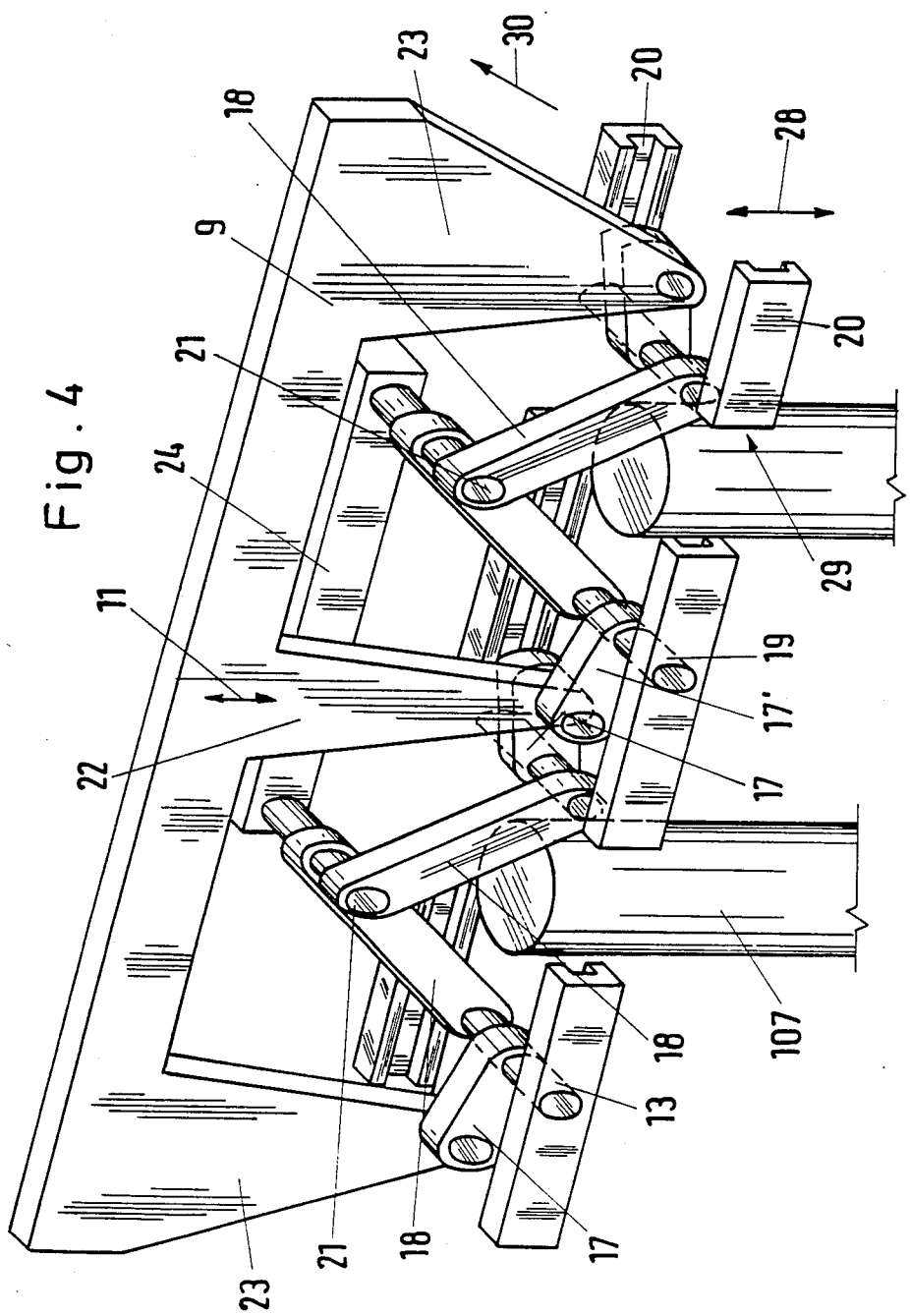
FIG. 4 is a perspective and even more diagrammatic view of the movable carrier, the guide rails and connecting levers.

In FIG. 2, the synthetic plastics injection moulding apparatus generally designated 37 is shown on an enlarged scale and more clearly together with the mandrel carrying wheels disposed underneath it and above the conveyor means 38. For opening and closing the individual mould parts 7, 8, the motor 49 and the cam plate 50 are provided and are shown in FIG. 2, on the left of the machine. The driving force is introduced into the movable carrier 9 via the lever 51. Mounted on the carrier 9, at the top, is a supply injector 10, 10' while at the bottom there are the injector heads 5 which move jointly in the direction of the double-headed arrow 11 (FIGS. 3 and 4). By reason of this upwards and downwards movement of the carrier 9, the upper mould halves 7 and 8 close and open, and can move sufficiently towards the adjacent pair of mould parts, each pair moving together and away sufficiently that the relevant mandrel 4 can pass without hindrance between each pair. The relatively short heating ducts 12 can be seen (FIG. 3), which carry the extruded synthetic plastics material between supply injector 10 and injector heads 5.

Figure 5:
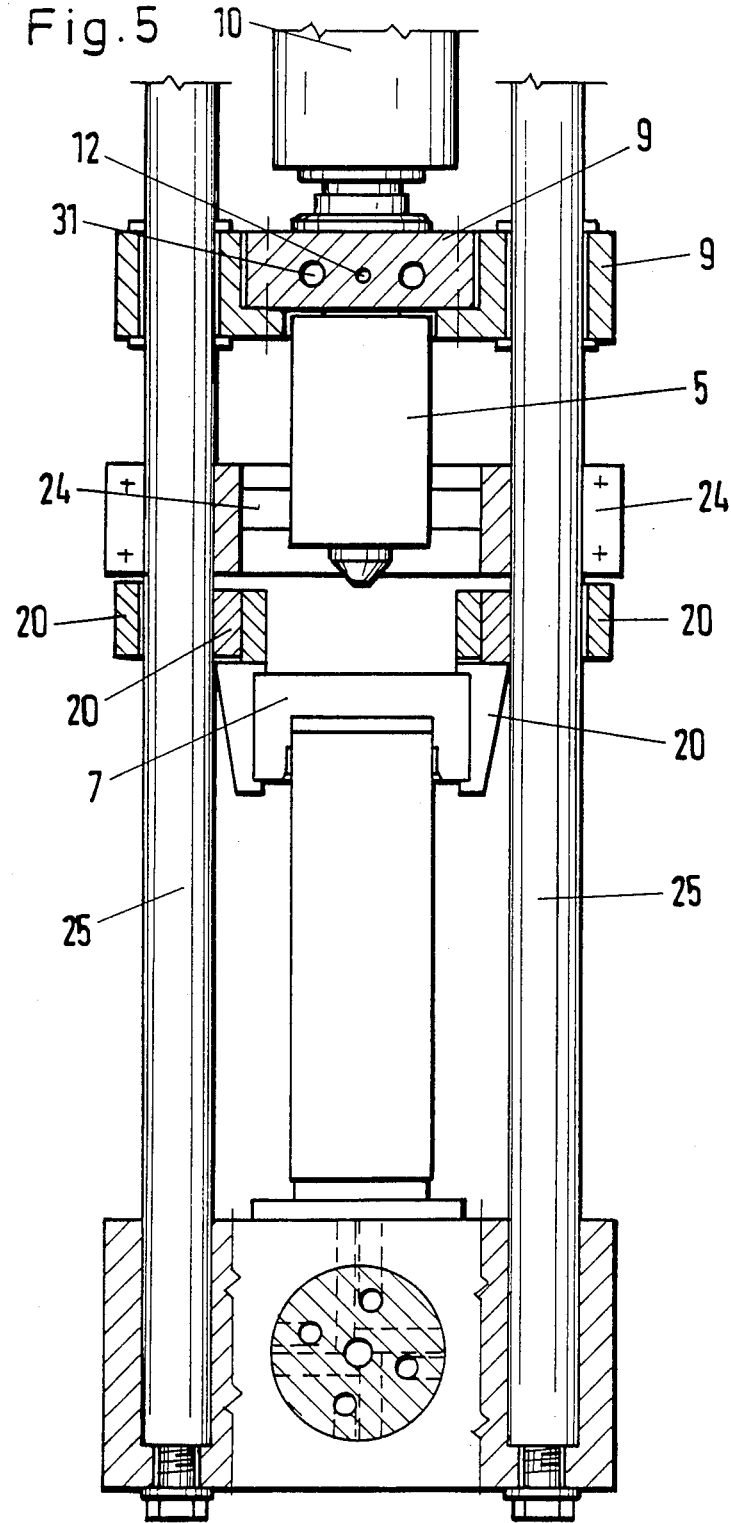
FIG. 5 is a sectional view through FIG. 3 taken on the line V—V.

The injection moulding apparatus 37 shown in FIG. 2, with upper mould parts 7 and 8 is more clearly shown in FIGS. 3 to 5. Of the mandrel-carrying wheel not shown, these drawings only show in each case the paper tube 107 which forms the side walls of one embodiment of package 13. FIG. 3 shows two working conditions, in the left-hand half the injection condition with closed mould parts 7, 7' and 8, 8' while in the right-hand half is shown the other condition in which the mandrels with the paper tubes 107 can pass through the opened upper mould parts 7", 7''' and 8", 8'''. Thus it is possible right away to see the opening direction 14 and closing direction 15 of the mould parts 7 and 8. (Articulation and movement of the mould is described mainly with respect to FIG. 3 and with regard to one station, it being understood that the other stations provided with one or more apostrophes operate in the same manner.) The distance X between two separately disposed injector heads 5 or pairs of mould parts 16 is made possible by the favourable disposition of the connecting levers which will be described in greater detail hereinafter.

The connecting levers namely comprise ties 18 and knee levers 17, 17' which are provided in pairs. Each pair of mould parts 16 is guided by means of two bearing journals 19 and further (not shown) journals in a rail 20 extending parallel with the directions 14, 15 of opening and closure of the mould parts 7, 8. Furthermore, each bearing journal 19 disposed between pairs 16 of mould parts is articulated at one end through the pairs of knee levers 17, 17' to be rotatable on the nearest mould part 7', 8' and at the other end on the tie 18 which is maintained stationary at one end. The two knee levers 17, 17' are, at a movable pivot point 21, connected to each other and to the movable carrier 9. The mould upper parts 7, 8 are, furthermore, adapted to move apart laterally of the mandrel 4 for opening purposes, so that the mandrel 4 with the paper tube 107 can pass freely between them. FIG. 3 shows on the left and FIG. 4 in the middle that the knee levers 17, 17' of a pair of adjacent pairs 16 of mould parts, when the mould parts 7, 8 are in the closed state, are at an angle of about 3° to one another. For practical purposes, they form one line from bearing journal 19 to bearing journal 19, so that the pressure forces which arise during the injection moulding process are mutually supporting and self-cancelling.

FIGS. 3 and 4 likewise show the comb-like form of the movable carrier 9 particualrly clearly, namely with its middle arms 22 and end arms 23.

It has been explained hereinabove that the rotatably articulating ties 18 are stationarily mounted at one end. This stationary mounting is achieved by the stationary suspension 24 which is rigid on the machine frame through machine columns 25 in the manner indicated in FIG. 5.

The fixing screw 26 in FIG. 3, at the top, shows one possible method of attachment of the supply injector 10' on the carrier 9. The slightly curved double-headed arrow 27 shown centrally at the bottom of FIG. 3 illustrates the actual movement of the mould halves 7, 8, by which also the rails 20 which are disposed pairwise and at a distance from each other and which are of C-shaped cross-section, are moved upwardly and downwardly, as indicated by the double-headed arrow 28 in FIG. 4. It will be understood that the rails 20 have in front of and after each mandrel 4 a port 29, as shown in FIGS. 3 and 4. In this way, the paper tubes 107 can always pass freely under the rail 20 for straight guidance of the upper mould halves 7, 8. In the perspective view shown in FIG. 4, the arrow 30 indicates the direction of movement of the paper tubes 107. Reference numeral 31 in FIG. 5 denotes the heating cartridge.

Figure 6:
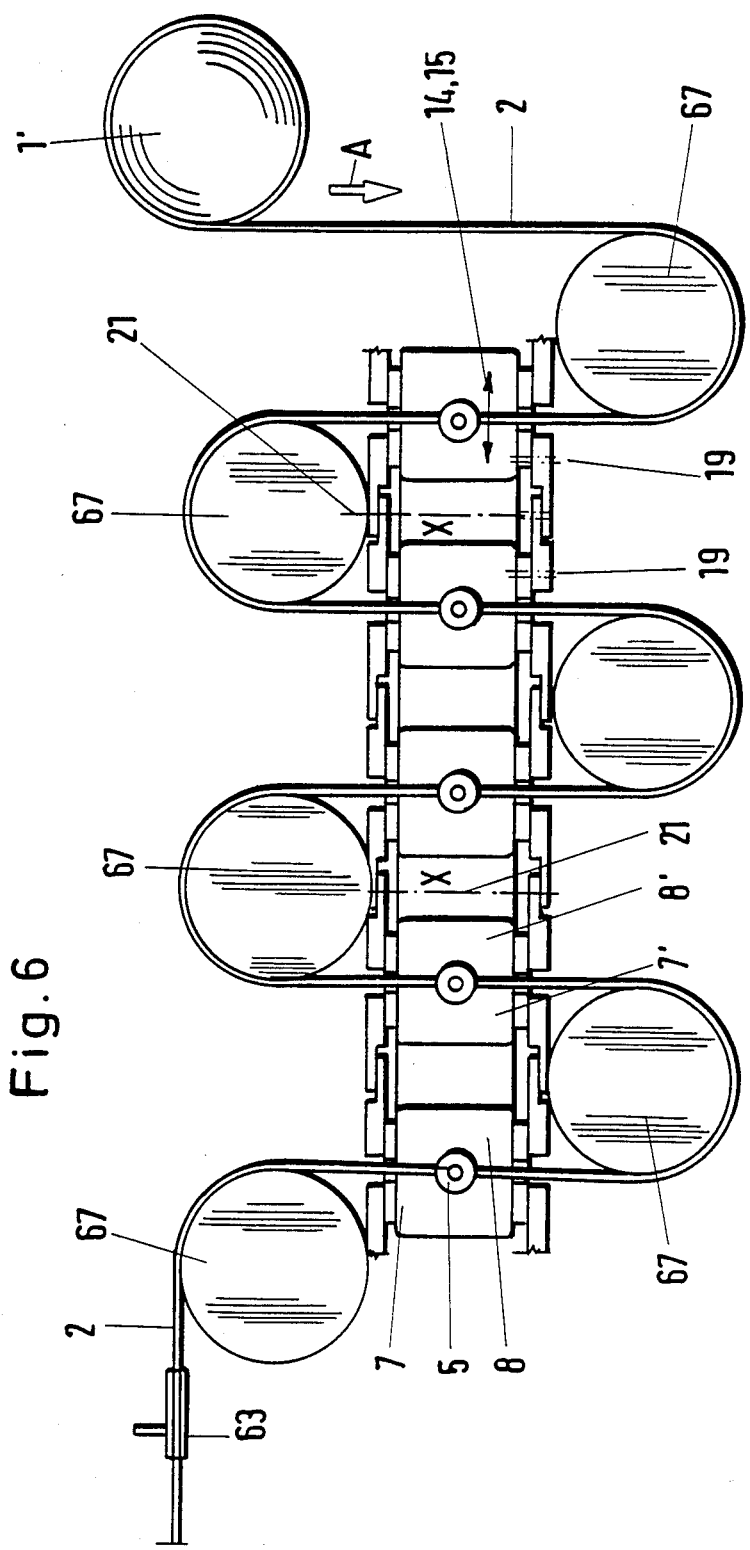
FIG. 6 is a plan view of a diagrammatically disposed different device for injection moulding an opening device into the prestamed hole in a paper web.

FIG. 6 shows in a simplified view a different kind of machine for producing a liquid packaging 13', in which an opening device 63 of synthetic plastics material is injected into an end wall 6 of the packaging 13'. This packaging shown in FIG. 9 consists entirely of paper coated on both sides with synthetic plastics material, the side walls 107 (which can also be described as a paper tube) and the end walls, of which only the upper end wall 6 is shown, are connected by folded edges 64, 65 or welded seam 66.

Figure 9:
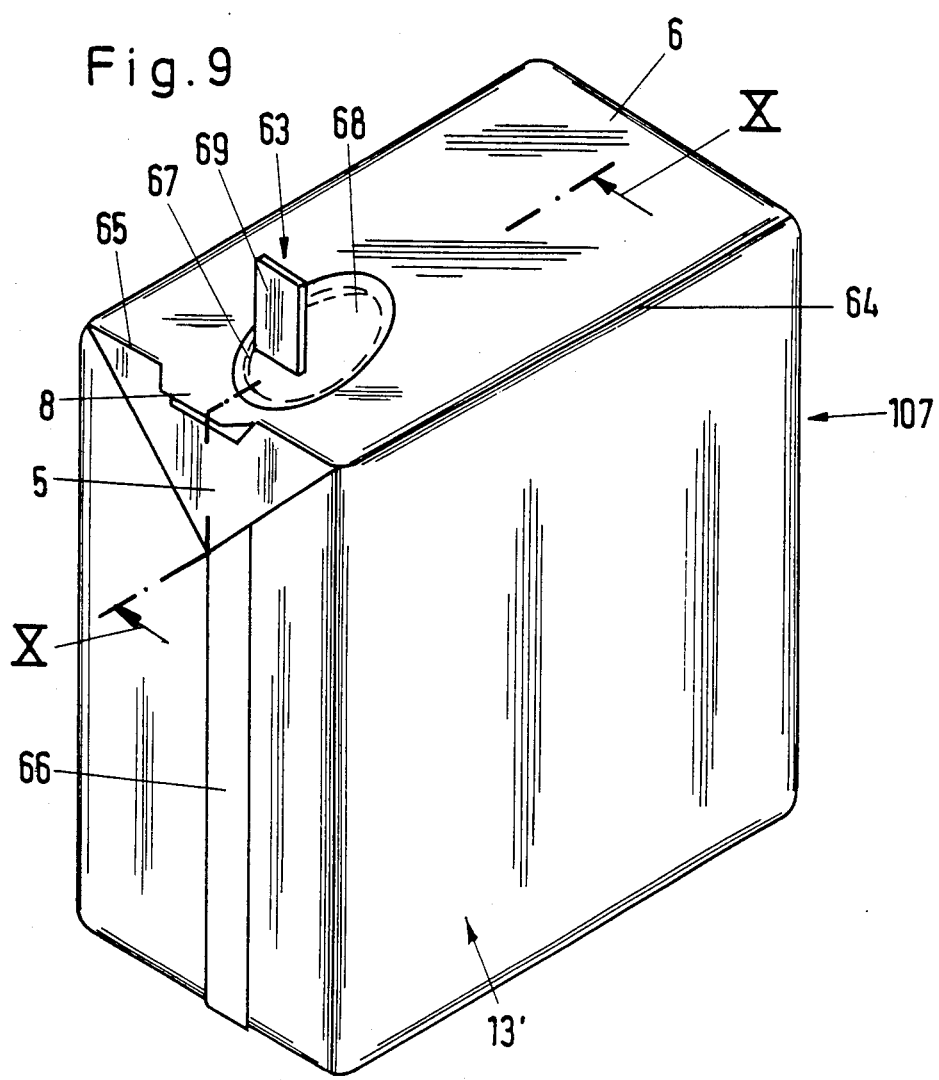
FIG. 9 shows a packaging carrying an opening device which can be produced with the machine shown in FIG. 6.

In FIG. 6, the paper web 2 is drawn from a supply roll 1' in the direction of the arrow A and passes zigzag-wise several times, in this case five times, over guide rollers 67, six of which are shown here, and through a chain of injecting apparatuses 37. Let it be assumed that there are in the paper web 2 prestamped holes 67' which are spaced apart from one another in the direction of movement A, in such a way that when the entire web is stopped at the station shown in FIG. 6, one hole 67' is positioned exactly opposite each of the injector heads 5. The drawing shows here only the mould halves 7, 8; 7', 8', etc., which are grouped together in pairs; with bearing journals 19 and the layers of movable pivot points 21. The opening device 63 according to FIG. 9 is likewise shown in FIG. 6 as already injected at the end of the web 2 which is on the discharge side. FIG. 6 shows that the relevant plane of the paper web 2 which is guided through the chain of injection devices 37 always extends at a right-angle to the opening closing movement 14, 15 of the mould parts 7, 8.

Figure 7:
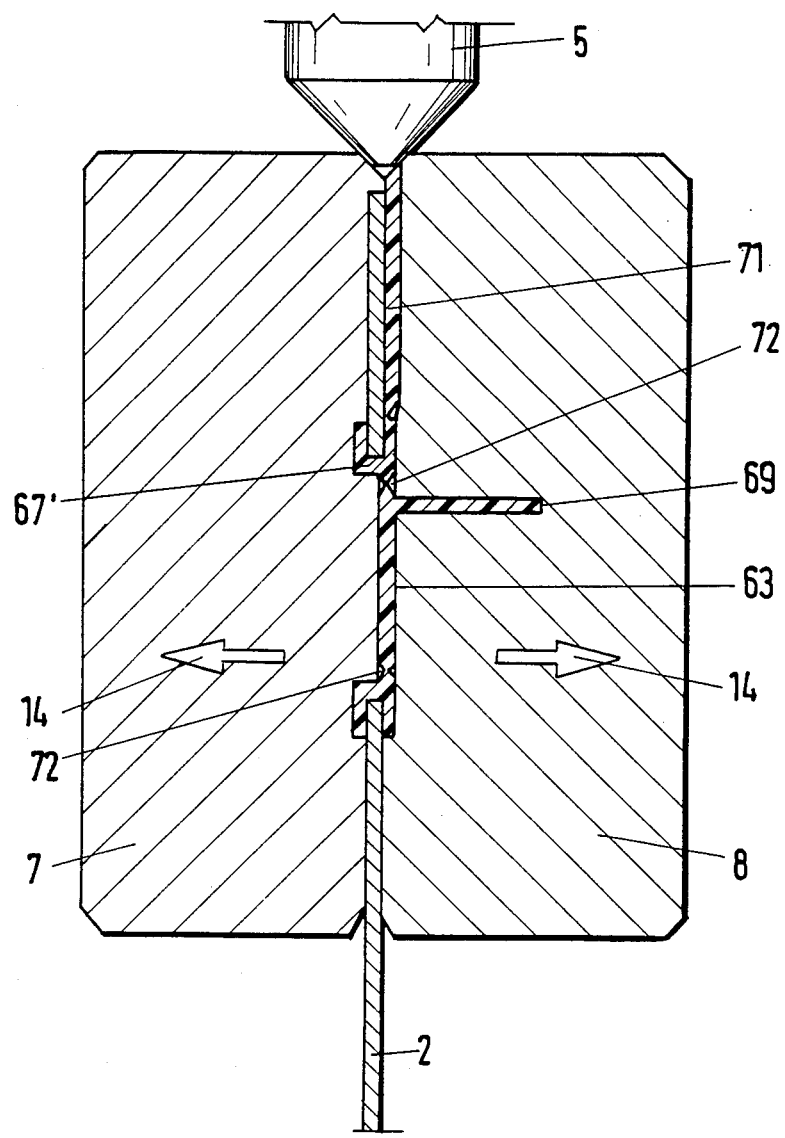
FIG. 7 shows the development of the moulding space in the region of the stamped out hole in the paper web in a sectional view taken centrally through the opening device which is to be produced and with diagrammatically shown mould parts.

Shown in a diagrammatic and enlarged view in FIG. 7 is a section through two mould halves 7, 8 with arrows 14 to show the opening movement. In between is the paper web 4 with the stamped out hole 67' into which the opening device 63 is fitted, filling out the entire space in the mould. It can be seen how the opening device 63 has cover part 68 (FIG. 9) which engages over both sides of the free cut edge of the hole 67'. The strip 69 is intended to facilitate tearing open.

Figure 10:
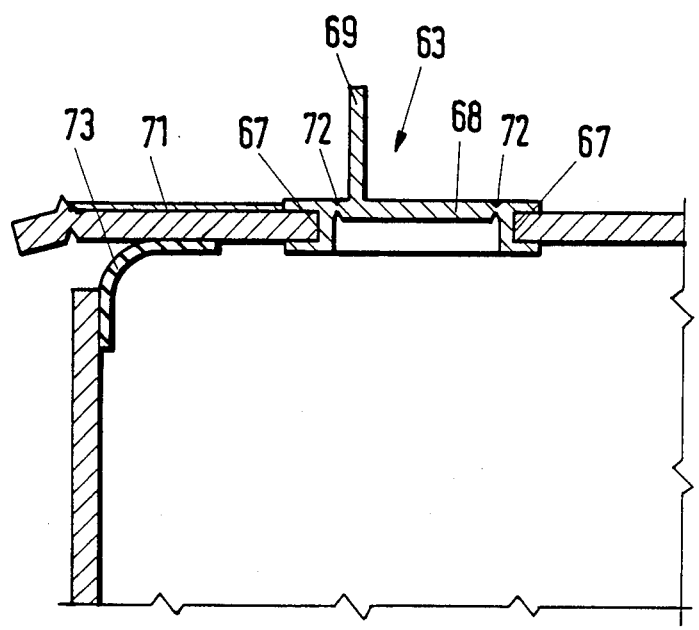
FIG. 10 is a broken away diagrammatic sectional view taken on the line X—X in FIG. 9.

Also FIG. 10 gives a sectional view taken on the line X—X in FIG. 9 and shows the opening device 63. The walls of the packaging are indicated in a broken away view.

Figure 8:
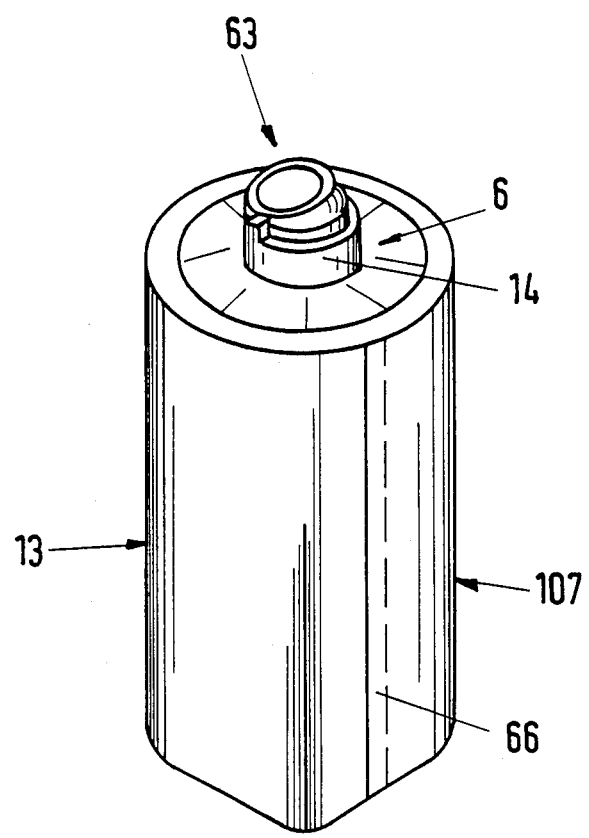
FIG. 8 is a view of a packaging which can be produced with the device shown in FIGS. 1 to 5.

If the above-described apparatus is used for producing a packaging to hold a liquid, by injecting on an end wall 6, then the packaging 13 obtained is as shown in FIG. 8. Here, the tube is shown with the sealing seam 22 at the bottom which is rectangular while the top is shown as round; the bottom is not actually shown while at the top edge of the tube 107 there is the injected on top 6 incorporating the opening device 63.

In the case of the embodiment shown in FIGS. 6, 7, 9 and 10, and in the case of manufacture according to FIG. 7, the injection passage 71 which provides for the flow of heated thermoplastics material from the injector head 5 to the opening device 63, is shown. The thread-like bead around this injection passage 71 remains clinging to the paper 2 after the two mould halves 7 and 8 have been pulled apart as indicated by the arrow 14. The injector head 5 then tears off this thermoplastics thread and the moulds 7, 8 are clean and free of plastics material.

Furthermore, weakening lines 72 can be seen, one of which is directly alongside the gripper strip 69 and serves as a tear-open aid. As illustrated in FIG. 10, the opening device 63 can be opened along this possibly endlessly extending line of weakness 72.

FIG. 10 also shows the inner covering strip 73 which provides for complete sealing-tightness of the liquid packaging 13'.

What is claimed is:

1. In a device for driving injection mould parts of a synthetic plastics injection apparatus for moulding a wall part on a paper web, and having at least one supply injector fixed on a carrier, a plurality of injector heads rigidly connected thereto and with driven connecting levers, the improvement wherein that a direction of conveyance of the paper web is substantially at a right-angle to the opening and closing direction of the mould parts, at least two pairs of mould parts movable relative to each other being disposed beside each other at a distance in the direction of opening and closure, with the connecting levers being in the form of ties and knee levers and being so articulated that each pair of mould parts is guided by at least two bearing journals in a rail extending parallel with the direction of opening and closure of the mould parts, each bearing journal being disposed between pairs of mould parts and being articulated on the one hand through two pairwise disposed knee levers to be rotatable on the nearest mould part and on the other on a tie which is maintained stationary at one end, the two knee levers being connected to each other at a movable pivot point and to the movable carrier and the bearing journal which guides the outermost mould part being connected on the one hand to a stationary tie at one end and on the other, through a knee lever is rotatably connected to the movable carrier.

2. In a device according to claim 1, wherein the improvement further includes the knee levers of each pair of knee levers of adjacent mould part pairs being, in the closed condition of the mould parts, disposed substantially in line behind one another at an angle of 0° to 15° in respect of each other.

3. In a device according to claim 1 or 2, wherein the improvement includes the rail being movable at a right-angle to its longitudinal axis by the bearing journals mounted therein.

4. In a device according to one of claims 1 to 2, wherein the improvement further includes the carrier being in the form of a comb with end arms and middle arms on a free end of which is the movable pivot point.

5. A device according to one of claims 1 to 2, the improvement wherein each pair of mould parts forms an upper mould part and in that bottom mould parts which are movable relative thereto are formed by intermittently rotatably driven mandrels fixed on a wheel, and in that the spindle of the wheel is disposed substantially in the opening and closure direction of the upper mould part and in that at least two wheels have a common axis of rotation and are disposed beside each other at a distance.

6. In a device according to claim 2, the improvement further comprising, the rail being movable at a right-angle to its longitudinal axis by the bearing mounted journals therein and the carrier being in the form of a comb with end arms and middle arms on a free end of which is a movable pivot point.

* * * * *